(12) United States Patent
Maurel et al.

(10) Patent No.: US 11,713,799 B2
(45) Date of Patent: Aug. 1, 2023

(54) ELECTRIC DRIVETRAIN FOR MOTOR VEHICLE

(71) Applicant: VALEO EMBRAYAGES, Amiens (FR)

(72) Inventors: Herve Maurel, Cergy Pontoise (FR); Guillaume Boidin, Cergy Pontoise (FR); Pierre Cholvy, Cergy Pontoise (FR); Gregory Foucart, Cergy Pontoise (FR); Norberto Termenon, Cergy Pontoise (FR); Cyrille Corniglion, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 57 days.

(21) Appl. No.: 17/022,292

(22) Filed: Sep. 16, 2020

(65) Prior Publication Data

US 2021/0079991 A1 Mar. 18, 2021

(30) Foreign Application Priority Data

Sep. 17, 2019 (FR) ...................................... 19 10261

(51) Int. Cl.
*F16H 47/08* (2006.01)
*B60K 1/00* (2006.01)
(Continued)

(52) U.S. Cl.
CPC ............... *F16H 47/08* (2013.01); *B60K 1/00* (2013.01); *B60K 17/02* (2013.01); *B60K 17/16* (2013.01);
(Continued)

(58) Field of Classification Search
CPC ........ F16H 47/08; F16H 45/02; F16H 37/043; F16H 2037/044; F16H 2306/48;
(Continued)

(56) References Cited

U.S. PATENT DOCUMENTS

| 10,030,751 B2 * | 7/2018 | Taskiran | ............... F16H 37/084 |
| 10,974,593 B2 * | 4/2021 | Duan | .................... B60W 20/30 |

(Continued)

FOREIGN PATENT DOCUMENTS

| DE | 10 2015 215965 A1 | 2/2017 |
| DE | 10 2019 114902 A1 | 3/2020 |

(Continued)

OTHER PUBLICATIONS

French Preliminary Search Report dated Jun. 5, 2020 in French Application 19 10261 filed on Sep. 17, 2019 (with English Translation of Categories of Cited Documents & Written Opinion), citing documents AA & AO therein, 11 pages.
European Search Report dated Aug. 11, 2021, in European Application No. 211612536, citing documents AO-AS therein, 15 pages.

*Primary Examiner* — Tinh Dang
(74) *Attorney, Agent, or Firm* — Oblon, McClelland, Maier & Neustadt, L.L.P.

(57) ABSTRACT

An electric drivetrain including an electric machine and at least one output pinion intended to be connected to an axle differential, and at least one speed reduction device including a first gear train and a second gear train intended to drive the output pinion in rotation in a first rotational direction or a second rotational direction.

9 Claims, 3 Drawing Sheets

(51) Int. Cl.
  *B60K 17/02* (2006.01)
  *B60K 17/16* (2006.01)
  *F16H 45/02* (2006.01)
  *F16H 37/04* (2006.01)

(52) U.S. Cl.
  CPC ........ *F16H 45/02* (2013.01); *B60K 2001/001* (2013.01); *B60Y 2200/91* (2013.01); *F16H 37/043* (2013.01); *F16H 2037/044* (2013.01); *F16H 2306/48* (2013.01)

(58) Field of Classification Search
  CPC ...... F16H 47/06; F16H 61/14; F16H 37/0813; F16H 2200/0021; B60K 1/00; B60K 17/02; B60K 17/16; B60K 2001/001
  See application file for complete search history.

(56) References Cited

U.S. PATENT DOCUMENTS

| | | | |
|---|---|---|---|
| 11,260,741 B2 * | 3/2022 | Li | B60K 6/24 |
| 2010/0078281 A1 * | 4/2010 | Kajigai | B60W 10/023 |
| | | | 192/3.21 |
| 2019/0092157 A1 * | 3/2019 | Sekiguchi | B60K 1/00 |

FOREIGN PATENT DOCUMENTS

| | | | |
|---|---|---|---|
| EP | 3 767 132 A1 | 1/2021 | |
| FR | 2 693 527 A1 | 1/1994 | |
| FR | 3 100 755 A1 | 3/2021 | |
| WO | WO 2018/045146 A1 | 3/2018 | |
| WO | WO-2018045146 A1 * | 3/2018 | ............... B60K 1/00 |

\* cited by examiner

[Fig.1]
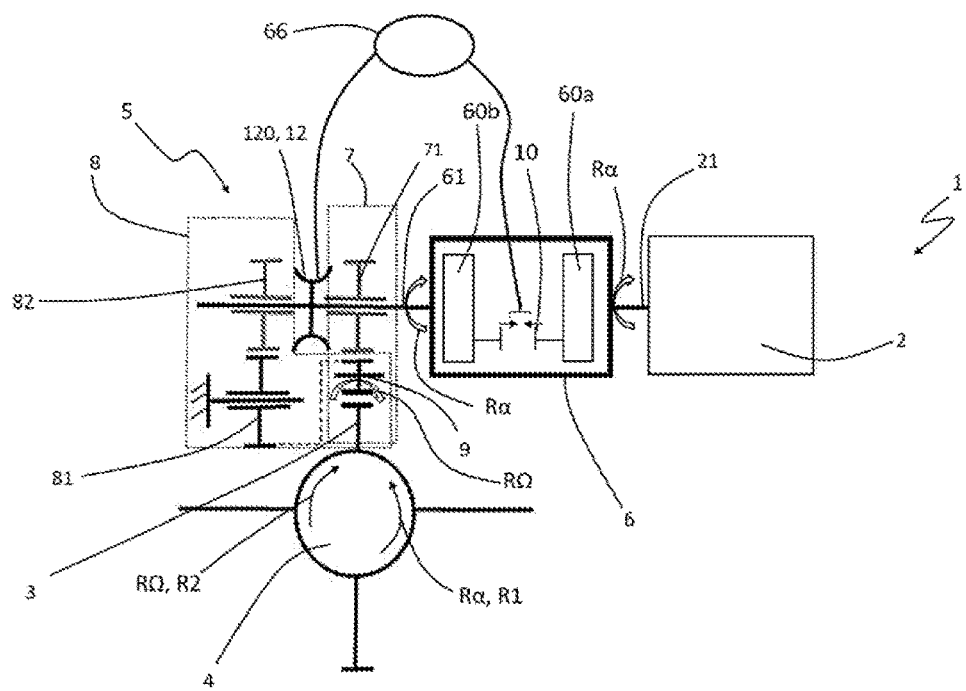
[Fig.2]
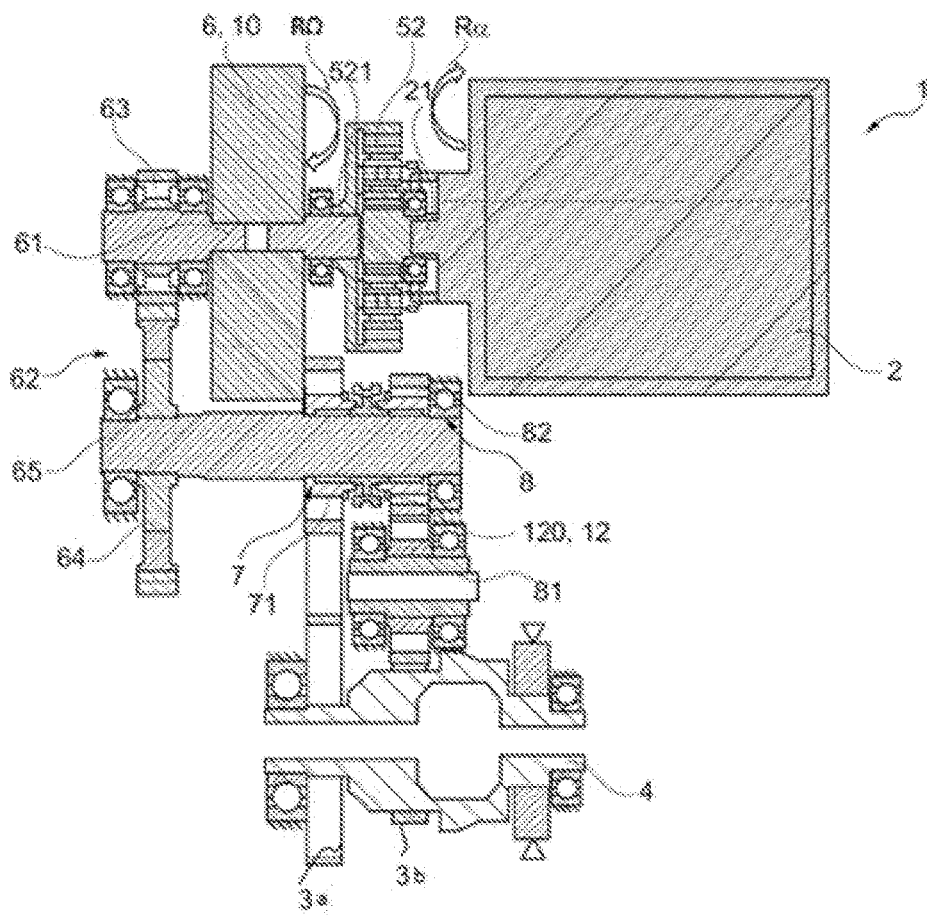

[Fig.3]
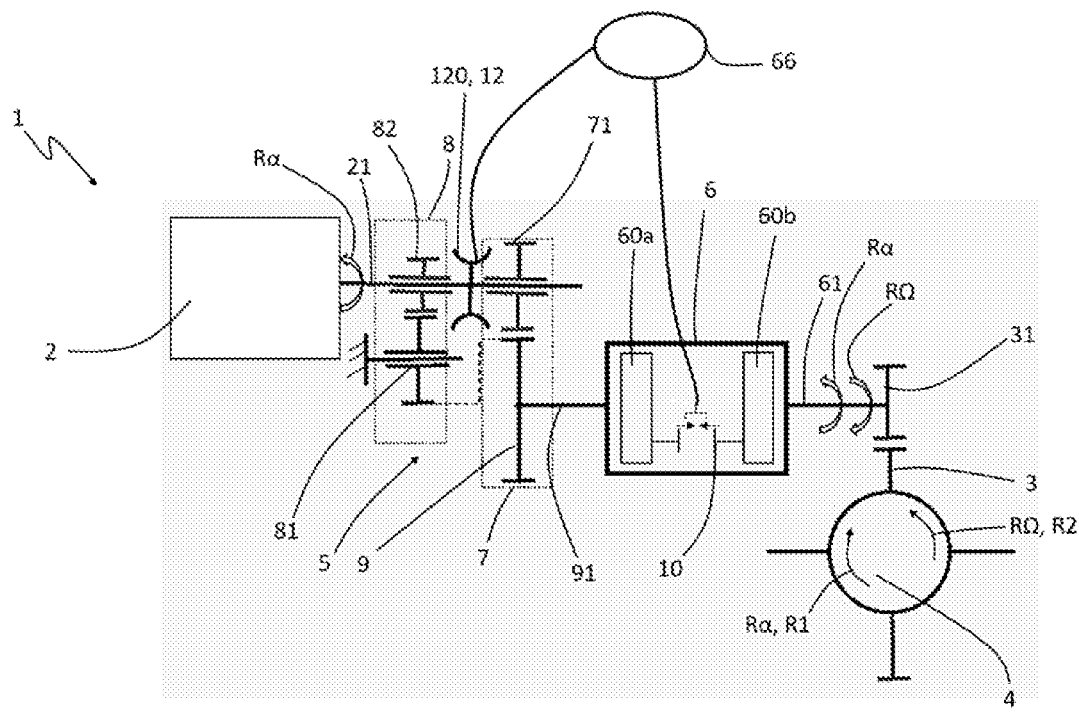
[Fig.4]
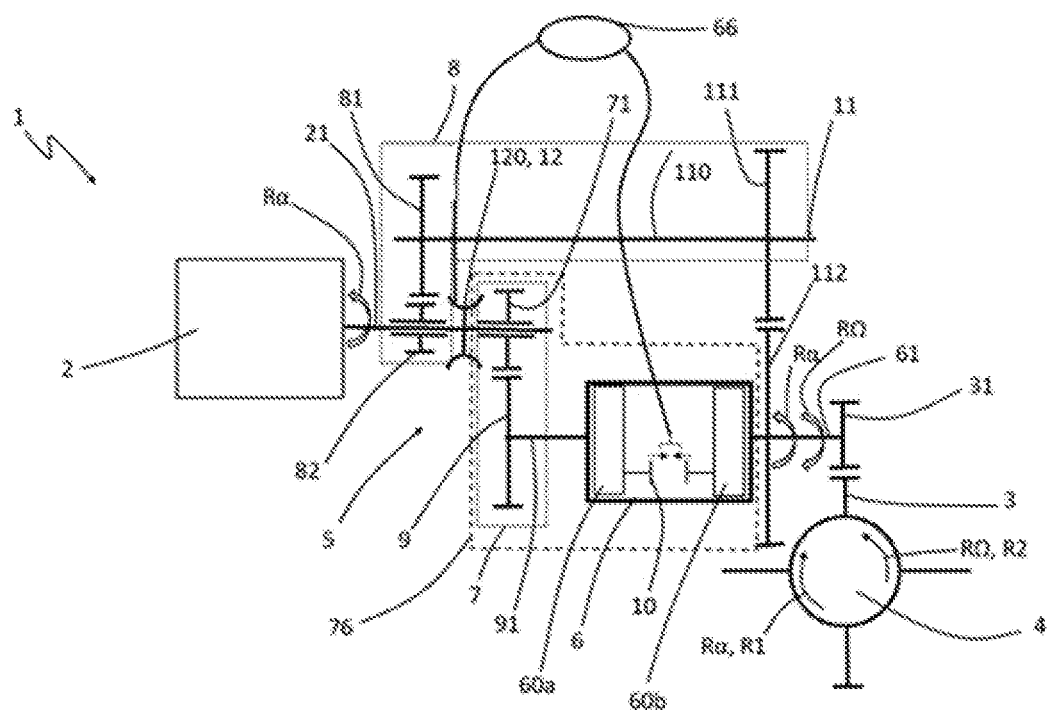

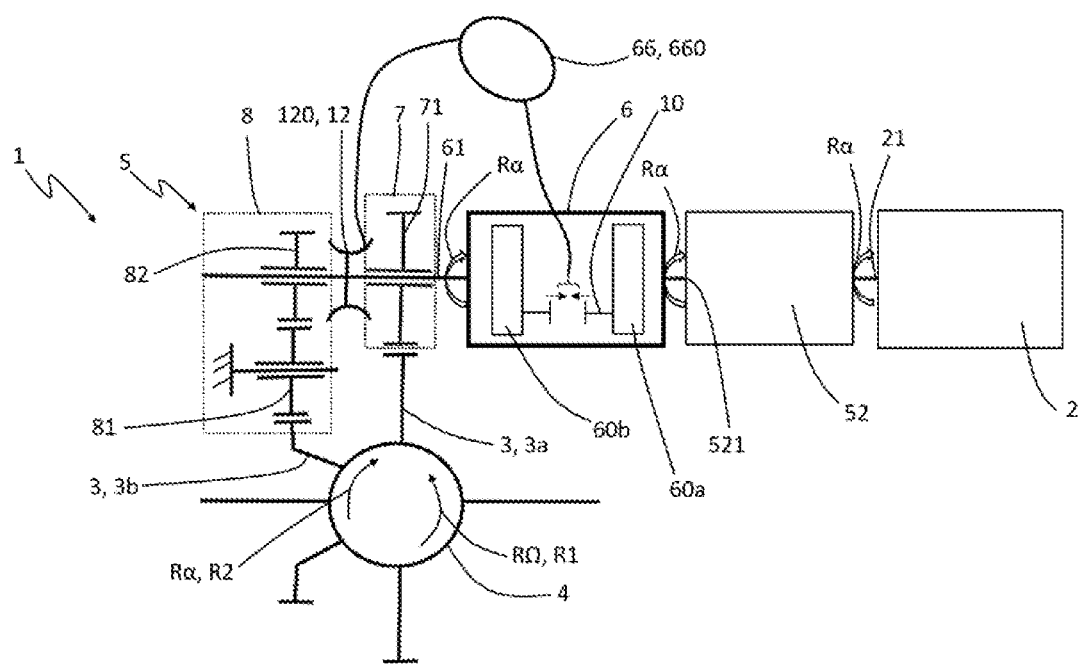
[Fig.5]

ELECTRIC DRIVETRAIN FOR MOTOR VEHICLE

BACKGROUND OF THE INVENTION

The invention relates to a drivetrain for a motor vehicle. More particularly, the invention relates to an electric drivetrain for an electric or hybrid motor vehicle.

In the known fashion, drive devices for electric or hybrid motor vehicles comprise an electric machine which converts electrical energy into mechanical energy, and a speed reduction device connected to an axle differential. The speed reduction system allows the movement of the axle differential to be engaged in a first rotational direction or second rotational direction opposite the first rotational direction by reversing the rotational direction of the electric motor, so as to allow the vehicle to move in forward or reverse gear.

To adapt to the different vehicle speeds, it is also known to use clutches which allow selection of the desired reduction ratio at the level of the speed reduction device. Such a device is disclosed in DE102016202723, for example. Such devices are costly and complex.

BRIEF SUMMARY OF THE INVENTION

The invention aims to remedy the above-mentioned drawbacks and proposes integrating a torque converter in an electric drivetrain. The torque converter in fact has the advantages of offering both a continuous gear ratio variation without torque interruption and an engine brake, in particular when the latter has a direct connection element.

Also, in the case of a drivetrain equipped with a single gear ratio, use of a torque converter allows a reduction in the size of the electric machine.

The invention also provides a drivetrain for an electric or hybrid vehicle supplying firstly a reverse gear and secondly a continuous gear ratio variation in a simple and low-cost fashion.

The invention thus concerns an electric drivetrain for a vehicle comprising at least one electric machine, at least one output pinion intended to be connected to an axle differential of the vehicle, and at least one speed reduction device, wherein the electric drivetrain comprises at least one torque converter arranged between the electric machine and said at least one output pinion, wherein the speed reduction device comprises at least a first gear train and a second gear train, the first gear train generating a movement of the or the at least one output pinion in a first rotational direction, and the second gear train generating a movement of the or the at least one output pinion in a second rotational direction opposite the first rotational direction.

In other words, the drivetrain is arranged such that the electric machine turns in a same rotational direction in order to drive the output pinion in the first rotational direction and in the second rotational direction.

The electric drivetrain is a device allowing the motor vehicle to be set in motion by means of the electric machine which converts electrical energy into mechanical energy, and by means of the axle differential to which the electric drivetrain is connected. The axle differential constitutes the part of the vehicle carrying at least one wheel, in particular two, and which receives the mechanical energy supplied by the output pinion(s) of the electric drivetrain.

The speed reduction device is arranged between the electric machine and the output pinion and is able to generate a movement of the output pinion(s) in the first rotational direction and/or in the second rotational direction opposite the first rotational direction.

The first gear train then comprises at least one forward gear pinion, and the second gear train comprises at least one reverse gear pinion and an inverter pinion, wherein the inverter pinion participates in setting the output pinion in rotation in the second rotational direction.

The torque converter comprises a hydraulic coupling.

The torque converter is also known as a hydraulic converter.

The function of the torque converter is to transmit the torque from the electric machine to the other components of the electric drivetrain, demultiplying said torque when reducing speed, in particular during phases of start-up or pulling away of the vehicle.

The torque converter comprises at least a primary element and a secondary element with blades which allow agitation of a fluid so as to give a mutual rotational drive, with or without speed difference, of the primary and secondary elements.

The primary element may be an impeller, in particular connected to a cover.

The secondary element may be a turbine.

A reactor arranged between the primary element and the secondary element allows reorientation of the moving oil flow in order to increase the torque at the level of the secondary element relative to the torque of the primary element.

A direct connection element, in particular a friction connection element, may be arranged between the primary element and the secondary element in order to couple these together with no mutual speed difference.

The torque converter allows demultiplication of the torque coming from the electric machine. The invention also allows compatibility between the use of an electric machine generating the rotation of a drive shaft at high speed in a single rotational direction and a torque converter, the fluidic torque transmission elements of which are also configured to transmit a torque in a single rotational direction, and a speed reduction device which has two rotational directions, the first rotational direction and the second rotational direction, or in other words a rotational direction corresponding to forward gear and another rotational direction corresponding to reverse gear.

According to a characteristic of the invention, the electric drivetrain comprises at least two output pinions intended to be connected to an axle differential, wherein a first output pinion is driven by the first gear train in the first rotational direction and the second output pinion is driven by the second gear train in the second rotational direction.

The electric drivetrain then comprises the first output pinion and the second output pinion connected to the axle differential. This configuration of the electric drivetrain allows simplification and limits the number of pinions in the speed reduction device, and thus allows a size reduction of the electric drivetrain relative to an electric drivetrain with only a single output pinion.

According to a characteristic of the invention, the torque converter is arranged in the electric drivetrain, kinematically between on the one side the electric machine and on the other the first and second gear trains of the speed reduction device.

Such an arrangement of the torque converter allows demultiplication of the output torque of the electric machine, and thus provides more torque at the input to the speed reduction device than at the output from the electric machine.

According to an alternative embodiment of the invention, the torque converter is arranged in the electric drivetrain, kinematically between the first gear train of the speed reduction device and said at least one output pinion.

According to another alternative embodiment of the invention, the torque converter is arranged in the electric drivetrain, kinematically between on the one side the first gear train and the second gear train of the speed reduction device, and on the other a same output pinion which can be driven by the first gear train in the first rotational direction and by the second gear train in the second rotational direction.

Such an arrangement of the torque converter, kinematically downstream of the speed reduction device, allows the torque to be demultiplied after it has passed through the speed reduction device. Thus the forces on the first gear train and second gear train are reduced, and these may have a reduced size in comparison with the embodiment in which the torque converter is kinematically arranged between the electric machine and the speed reduction device.

According to a characteristic of the invention, the torque converter comprises a primary element and a secondary element which is driven in rotation by the primary element under the effect of the fluid projected by the primary element, wherein the torque converter comprises an element for direct connection of the primary element to the secondary element, the direct connection element being switchable between an open state and a closed state.

In its open state, the direct connection element separates the primary element and secondary element such that these rotate independently of each other, i.e. the secondary element is driven in rotation solely by the fluid projected by the primary element.

In its closed state, the direct connection element is fixed to the primary element and secondary element such that these are fixed together by means of the direct connection element. The primary element and the secondary element then have synchronized rotation, wherein the primary element carries the secondary element in rotation via the mechanical link created by the direct connection element. In its closed state, the direct connection element firstly allows conversion of the mechanical energy into electrical energy which is redirected towards the electric machine during braking or deceleration phases of the motor vehicle, and secondly prevents demultiplication of the torque, the primary and secondary elements then being driven in rotation at identical speed.

According to a characteristic of the invention, the electric drivetrain comprises at least one auxiliary speed reducer arranged in the electric drivetrain, kinematically between the electric machine and the torque converter and/or between on the one side the electric machine and on the other the first and second gear trains of the speed reduction device, and/or between on the one side the torque converter and on the other the first and second gear trains of the speed reduction device.

The function of the speed reducer is in particular to increase the torque while reducing the rotational speed at the input to the torque converter. Thus the service life of the electric drivetrain is extended and its usage reliability increased.

According to a characteristic of the invention, the second gear train is arranged in parallel with a transmission subassembly comprising the first gear train and the torque converter.

In this configuration, it is understood that the second gear train of the speed reduction device is arranged in the electric drivetrain, bypassing the transmission subassembly formed by the first gear train and the torque converter.

According to a characteristic of the invention, a coupling device allows the torque to be directed into only one of the first gear train or the second gear train.

According to a characteristic of the invention, the coupling device comprises a synchronizer which is rotationally fixed to a shaft of the electric drivetrain and arranged between the first gear train and the second gear train, wherein the synchronizer can be switched between at least a state of engagement with the first gear train, a state of engagement with the second gear train, and a free state.

More precisely, the synchronizer can be switched between a state of engagement with the forward gear pinion of the first gear train or with the reverse gear pinion of the second gear train, or be in the free state. When the synchronizer is engaged with the one or the other of the forward gear pinion and reverse gear pinion, it drives in rotation the pinion to which it is fixedly connected.

According to a characteristic of the invention, the coupling device and the direct connection element of the torque converter are displaceable under the action of a pressurized fluid, wherein the electric drivetrain comprises a common fluid source for actuation of the direct connection element of the torque converter and for actuation of the coupling device. The fluid source may for example be a pump and an oil circuit.

According to a characteristic of the invention, the electric drivetrain comprises an actuating device which is configured to close the direct connection device when the coupling device is in engagement with the second gear train.

In other words, when the output pinion is driven in rotation in the second rotational direction, the direct connection device is in its closed state, i.e. it fixes the primary element to the secondary element of the torque converter. Thus the second gear train is directly adapted for the rotational speed of the electric machine to be compatible with the use of the output pinion in the second rotational direction.

The invention also concerns a method for controlling an electric drivetrain of a vehicle, the electric drivetrain comprising an electric machine, at least one output pinion connected to an axle differential and able to drive the axle differential in a first rotational direction or in a second rotational direction opposite the first rotational direction, a torque converter arranged in the torque transmission pathway between the electric machine and said at least one output pinion and able to drive said at least one output pinion in both rotational directions, wherein the torque converter comprises a primary element and a secondary element which is driven in rotation by the primary element under the effect of the fluid projected by the primary element, the torque converter comprising an element for direct connection of the primary element to the secondary element, wherein the method comprises a step of closing the direct connection element when the axle differential is driven in the second rotational direction, the second rotational direction being associated with reverse gear of the vehicle, or when a torque is transmitted from the axle differential to the electric machine.

As mentioned above, it is not necessary for the torque converter to demultiply the torque in order to set the axle pinion in rotation in the second rotational direction. Thus the direct connection element fixed to the primary element and secondary element of the torque converter blocks the torque demultiplication by the torque converter.

According to a characteristic of the control method, in a stage in which the direct connection element is closed, the electric machine is able to convert the kinetic energy of the motor vehicle into electrical energy.

According to a characteristic of the control method, the electric drivetrain comprises a first gear train and a second gear train, the first gear train generating a movement of the axle differential in a first rotational direction, and the second gear train generating a movement of the axle differential in the second rotational direction, and a coupling device comprising at least one synchronizer able to direct the torque between the first gear train and the second gear train, wherein the step of closing the direct connection element takes place before or during the engagement of the synchronizer with the second gear train.

The invention also concerns a transmission system comprising at least one electric drivetrain according to any of the above-mentioned characteristics of the electric drivetrain, and an axle differential kinematically connected to said at least one output pinion.

The invention also extends to a vehicle equipped with said electric drivetrain or said transmission system.

BRIEF DESCRIPTION OF THE SEVERAL VIEWS OF THE DRAWINGS

Further features, details and advantages of the invention will become more clearly apparent, on the one hand from reading the following description, and on the other hand from several exemplary embodiments given by way of nonlimiting indication, with reference to the attached schematic drawings, in which:

FIG. 1 is a schematic view of an electric drivetrain according to a first embodiment of the invention;

FIG. 2 is a schematic view of the electric drivetrain according to a second embodiment of the invention;

FIG. 3 is a schematic view of the electric drivetrain according to a third embodiment of the invention;

FIG. 4 is a schematic view of the electric drivetrain according to a fourth embodiment of the invention;

FIG. 5 is a schematic view of the electric drivetrain according to a fifth embodiment of the invention.

DETAILED DESCRIPTION OF THE INVENTION

The detailed figures of the description depict schematically an electric drivetrain 1 according to various embodiments which is used as a drive means for a motor vehicle, in particular an electric motor vehicle or a hybrid motor vehicle. These types of motor vehicle usually comprise at least one axle differential 4 which may be driven in rotation exclusively electrically or alternatively by means of an internal combustion engine.

In order to ensure the rotational drive of the axle differential 4, the electric drivetrain 1 comprises amongst others an electric machine 2 which converts an electrical energy into mechanical energy and by means of which said axle differential 4 and hence the motor vehicle is set in motion. In order to connect the axle differential 4 to the electric drivetrain 1, the latter comprises at least one output pinion 3 arranged at an end of the electric drivetrain 1 opposite the electric machine 2. It is understood that the output pinion 3 corresponds to an interface of the electric drivetrain 1 with the axle differential 4, allowing the former to be connected to the axle differential 4.

FIG. 1 illustrates a first embodiment of the electric drivetrain 1 comprising the electric machine 2, a torque converter 6, and a speed reduction device 5, wherein the assembly is connected to the axle differential 4 by means of the output pinion 3 of the electric drivetrain 1.

The electric machine 2 positioned at one end of the electric drivetrain 1 may, as stated above, drive the vehicle in motion or generate electricity in certain phases of movement of the vehicle. To this end, the electric machine 2 comprises a drive shaft 21 which is set in rotation in an alpha rotational direction Ra around an axis of revolution of the drive shaft 21. The drive shaft 21 is thus fixed firstly to the electric machine 2 and secondly to the torque converter 6. It is noted that the rotational direction of the drive shaft 21 remains identical whatever the rotational direction of the axle differential 4, i.e. whether the vehicle is moving in forward gear or in reverse gear.

The function of the torque converter 6, also known as a hydraulic converter, is to transmit the torque from the electric machine 2 to the other components of the electric drivetrain 1, demultiplying said torque when reducing speed, in particular during phases of start-up or pulling away of the vehicle. The torque converter 6 comprises at least a primary element 60a, a secondary element 60b, a reactor and a direct connection element 10, the assembly being housed in a casing. The primary element 60a and the secondary element 60b have blades which allow agitation of a fluid so as to obtain a mutual drive of the primary and secondary elements in rotation, with or without a speed difference.

More precisely, the primary element 60a of the torque converter 6 is fixed to the drive shaft 21 so that said primary element 60a is driven in rotation in the alpha rotational direction Ra. The rotational movement of the primary element 60a of the torque converter 6 generates, by means of blades, a centrifugal projection of a fluid housed in the casing, the fluid being oil for example. The projection of oil drives in rotation the secondary element 60b of the torque converter 6 in the same alpha rotational direction Ra of the drive shaft 21.

The reactor is arranged between the primary element 60a and the secondary element 60b and takes the form of a turbine allowing reorientation of the moving oil flow in the casing in order to increase the torque at the level of the secondary element 60b relative to the torque of the primary element 60a.

The torque converter 6 then, in particular during phases of start-up or pulling away of the vehicle, allows demultiplication of the torque from the electric machine 2 before it reaches the speed reduction device 5, and reduction of the rotational speed of the axle differential 4. The torque converter 6 also has the advantage of more flexible torque transmission, in particular because of its hydraulic operation.

The direct connection device 10 of the torque converter 6 is a device which allows the primary element 60a and the secondary element 60b to be linked in particular by friction, with no speed difference of the one relative to the other. More precisely, the direct connection element 10 can be switched into an open position, in other words a position in which the primary element 60a and the secondary element 60b are separated, and a closed position, in other words a position in which the primary element 60a and the secondary element 60b turn at the same speed since they are linked together by means of the direct connection element 10.

The direct connection element 10 allows limitation of the energy losses between the primary element 60a and the secondary element 60b by connecting them together when turning at the same speed, and thus ensures optimal torque transmission. In such a case, the speed at the input to the torque converter is equal to the output speed of the torque converter 6. This also avoids excess energy consumption by the electric drivetrain 1 when the primary element 60a and the secondary element 60b are rotating at the same speed. The use and benefit such a connection element 10 will be explained in more detail in the detailed description below.

The secondary element 60b is connected to a torque transmission shaft 61 at the output of the torque converter 6. In this first embodiment, the transmission shaft 61 is thus fixed firstly to the secondary element 60b of the torque converter 6 and secondly to the speed reduction device 5. It is understood that the speed reduction device 5 is kinematically positioned between the torque converter 6 and the output pinion 3.

The speed reduction device 5 comprises at least a first gear train 7 and a second gear train 8.

The first gear train 7, also referred to below as the forward gear train, allows creation of a movement of the output pinion 3 in a first rotational direction R1 associated with forward gear of the motor vehicle. The second gear train 8, also referred to below as the reverse gear train, allows creation of a movement of the output pinion 3 in a second rotational direction R2 opposite the first rotational direction R1 and associated with reverse gear of the motor vehicle.

The first gear train 7 comprises at least one forward gear pinion 71 and an intermediate pinion 9. More precisely, the forward gear pinion 71 is arranged in the electric drivetrain 1, kinematically between the torque converter 6 and the intermediate pinion 9. It is arranged around the transmission shaft 61 of the torque converter 6. The forward gear pinion 71 is thus movable in rotation around the transmission shaft 61 of the torque converter 6, i.e. is mounted loosely.

The intermediate pinion 9 is itself arranged in the electric drivetrain 1, kinematically between the forward gear pinion 71 and the output pinion 3.

The second gear train 8 comprises a reverse gear pinion 82 and an inverter pinion 81 connected to the intermediate pinion 9. The reverse gear pinion 82 is arranged in the electric drivetrain 1, kinematically between the transmission shaft 61 of the torque converter 6 and the inverter pinion 81. The reverse gear pinion 82 is freely or loosely mounted relative to the transmission shaft 61 of the torque converter.

The inverter pinion 81 is arranged in the electric drivetrain 1, kinematically between the reverse gear pinion 82 and the intermediate pinion 9, and is movable in rotation relative to a casing in which it is arranged.

In order to drive the output pinion 3 in rotation in the first rotational direction R1 or the second rotational direction R2, a coupling device 120, comprising for example a synchronizer 12, is arranged in the electric drivetrain 1 between the forward gear pinion 71 of the first gear train 7 and the reverse gear pinion 82 of the second gear train 8. The synchronizer 12 is fixedly mounted to the transmission shaft 61 and can be switched between a state of engagement of the first gear train 7 and a state of engagement of the second gear train 8.

More precisely, the synchronizer 12 is arranged in the electric drivetrain 1 between the forward gear pinion 71 and the reverse gear pinion 82, and can therefore be engaged alternatively with the forward gear pinion 71 or with the reverse gear pinion 82. The synchronizer 12 thus allows transfer of the rotational movement of the transmission shaft 61 of the torque converter 6 in the alpha rotational direction Rα towards the one or the other of the forward gear pinion 71 or the reverse gear pinion 82.

When the synchronizer 12 is engaged with the forward gear pinion 71, the latter is driven in rotation in the alpha rotational direction Rα corresponding to the rotational direction of the transmission shaft 61. This rotation of the forward gear pinion 71 drives the intermediate pinion 9 in rotation in a rotational direction opposite that of the forward gear pinion 71, corresponding to an omega rotational direction RΩ. Finally, the intermediate pinion 9 carries the output pinion 3 in rotation in the rotational direction opposite the omega rotational direction RΩ, i.e. in the alpha rotational direction Rα. The alpha rotational direction Rα of the output pinion 3 then corresponds to the first rotational direction R1 of the output pinion 3, the latter driving the axle differential 4 in a direction corresponding to the forward gear of the motor vehicle.

When the synchronizer 12 is engaged with the reverse gear pinion 82, the latter is driven in rotation in the alpha rotational direction Rα corresponding to the rotational direction of the transmission shaft 61 of the torque converter 6.

The inverter pinion 81 is then driven in rotation by the reverse gear pinion 82 in a rotational direction opposite that of the latter, i.e. in the omega rotational direction RΩ. It is understood that said inverter pinion 81 carries the intermediate pinion 9 in rotation in a rotational direction opposite its own, i.e. in the alpha rotational direction Rα, the intermediate pinion 9 then driving the output pinion 3 in rotation in the opposite rotational direction, i.e. in the omega rotational direction RΩ. The omega rotational direction RΩ of the output pinion 3 then corresponds to the second rotational direction R2 of the output pinion 3, the latter driving the movement of the axle differential 4 in a direction corresponding to the reverse gear of the motor vehicle.

It will be understood from the above that the output pinion 3 may be driven in rotation in the first rotational direction R1 or in the second rotational direction R2, by the configuration of the first gear train 7 and the second gear train 8 comprising the inverter pinion 81, and by the position of the synchronizer 12 which is switchable between the forward gear pinion 71 and the reverse gear pinion 82.

According to a characteristic of the invention, the electric drivetrain 1 comprises an actuating device 66 which is configured to close the direct connection device 10 of the torque converter 6 before or during engagement of the synchronizer 12 with the reverse gear pinion 82 of the second gear train 8. When the output pinion 3 and hence the axle differential 4 is set in rotation in the second rotational direction R2, there is no need for demultiplication of the torque coming from the electric machine. Thus the second gear train 8 is directly adapted for compatibility between the rotational speed generated by the electric machine 2 and the use of the output pinion 3 in the second rotational direction R2. The demultiplication ratio between the first gear train 7 and second gear train 8 is different. The direct connection device 10 thus allows direct transmission of the torque and speed generated by the electric machine 2 to the second gear train 8, i.e. without demultiplication.

The demultiplication ratio between the first gear train 7 and second gear train 8 may also be the same.

According to another characteristic of the invention, when the primary element 60a and the secondary element 60b are driven in rotation at an identical and constant speed, it is possible to close the direct connection element 10. This closed configuration of the direct connection element 10 firstly allows conversion of the mechanical energy into electrical energy which is redirected towards the electric machine 2 during braking or deceleration phases of the motor vehicle, and secondly prevents demultiplication of the torque by the torque converter 6, the primary element 60*a* and secondary element 60*b* then being driven in rotation at identical speed.

FIG. 2 illustrates an alternative to the first embodiment of the electric drivetrain 1 illustrated in FIG. 1. In the description which follows, only the characteristics which differ from the first embodiment will be explained. For the common characteristics, reference is made to FIG. 1 and its description.

The electric drivetrain 1 of the second embodiment of the invention comprises an auxiliary speed reducer 52 kinematically arranged between the electric machine 2 and the torque converter 6. The auxiliary speed reducer 52 takes the form of a epicyclic planetary train, a central planetary pinion of which is fixed to the drive shaft 21. The auxiliary speed reducer 52 also comprises at least one ring gear which houses for example three satellites that are in engagement with the central planetary pinion and the ring gear. All shafts of the satellites are carried by a satellite carrier, which in this embodiment is fixed relative to the casing of the drivetrain.

Rotation of the drive shaft 21 in the alpha rotational direction Rα then drives the central planetary pinion in rotation in the alpha rotational direction Rα, which then sets each satellite housed in the ring gear in rotation about its respective axis. The ring gear is then set in rotation by the satellites. Such a device allows an increase in torque while reducing the rotational speed of an output shaft 521 of the planetary train which is also connected to the torque converter 6. The output shaft 521 of the planetary train is then connected firstly to the auxiliary speed reducer 52 and also to the primary element 60*a* of the torque converter 6, and is driven in rotation in the alpha rotational direction RΩ.

The satellite carrier is here fixed relative to the casing, but in another embodiment (not shown), it is possible to fix the ring gear and drive the torque converter in the alpha rotational direction Rα by means of the satellite carrier.

Also in this second embodiment of the electric drivetrain 1, an auxiliary pinion set 62 is arranged on the electric drivetrain 1, kinematically between the torque converter 6 and the speed reduction device 5. This auxiliary pinion set or gear train forms an additional reduction stage and thus also plays the role of auxiliary reducer.

This auxiliary gear train is arranged between the transmission shaft 61 at the output from the torque converter and an intermediate shaft 65.

More precisely, a first auxiliary pinion 63 is mounted fixedly in rotation on the transmission shaft 61, kinematically between the torque converter 6 and a second auxiliary pinion 64. The second auxiliary pinion 64 is mounted fixedly in rotation on the intermediate shaft 65, on which the synchronizer 12 is also arranged between the forward gear pinion 71 and the reverse gear pinion 82.

It is understood that the intermediate shaft 65 of the auxiliary pinion set 62 is driven in rotation by means of the second auxiliary pinion 64 and the first auxiliary pinion 63, wherein the latter is fixed in rotation to the transmission shaft 61 of the torque converter 6. Thus the intermediate shaft 65 allows the forward gear pinion 71 or reverse gear pinion 82 to be driven in rotation by means of the synchronizer 12, as described above.

The auxiliary speed reducer 52 arranged in the electric drivetrain 1 allows an increase in the service life of the components of the electric drivetrain 1, in particular of the torque converter 6, by reducing the rotational speed of the shaft 521 of the planetary train which is fixed to the primary element 60*a* of the torque converter 6.

This embodiment is also characterized by the presence of two output pinions 3*a* and 3*b*. It should be noted here that FIG. 2 is a modified view, such that the three shafts are shown on the same plane. In reality, these three shafts are not on the same plane, which is why the engagement between the pinion 71 and 3*a* is not visible in this view. The use of two output pinions avoids the use of an intermediate pinion which must engage both the forward gear pinion and the reverse gear pinion.

A third embodiment will now be described with respect to FIG. 3. In this embodiment, the torque converter 6 is arranged in the electric drivetrain 1, kinematically between the speed reduction device 5 and the output pinion 3. It is understood that the inputs of the first gear train 7 and second gear train 8 of the speed reduction device 5 rotate at the same speed and receive the same torque as that generated by the drive shaft 21 of the electric machine 2.

An intermediate shaft 91 extends between the speed reduction device 5 and the torque converter 6. More precisely, the intermediate shaft 91 is fixed to the intermediate pinion 9 of the speed reduction device 5 and to the primary element 60*a* of the torque converter 6.

It is understood that the primary element 60*a* of the torque converter 6 may execute a rotational movement in the alpha rotational direction Rα or in the omega rotational direction RΩ, depending on whether the synchronizer 12 is in engagement with the forward gear pinion 71 or the reverse gear pinion 82 of the speed reduction device 5.

A connecting pinion 31 is arranged in the electric drivetrain 1, kinematically between the torque converter 6 and the output pinion 3. More precisely, the connecting pinion 31 is firstly fixed to the transmission shaft 61 and secondly drives the output pinion 3 in rotation. Said connecting pinion 31 is then driven in rotation in the omega rotational direction RΩ or in the alpha rotational direction Rα by the transmission shaft 61, so that it drives the output pinion 3 in rotation in a rotational direction opposite that in which it is itself rotating.

Since the geometry of the blades of the torque converter is configured so as to transmit torque in a single rotational direction, it is advantageous, when the synchronizer 12 is in engagement with the reverse gear pinion 82, for the direct connection element 10 to be closed so that the primary element 60*a* and the secondary element 60*b* of the torque converter 6 are fixed together.

One advantage of this embodiment is that it allows a size reduction of the first gear train 7 and of the second gear train 8 because of their kinematic positioning upstream of the torque converter 6. In fact, in the absence of an auxiliary reducer between the electric machine and the gear trains 7 and 8, the torque at the input to the speed reduction device 5 is not demultiplied. This configuration then reduces the force applied to the first gear train 7 and second gear train 8 in comparison with the preceding embodiments, and thus allows a size reduction of the speed reduction device 5 with respect to the preceding embodiments.

According to an alternative (not shown) of the third embodiment, it is possible to arrange the auxiliary speed reducer described with respect to FIG. 2 kinematically at the output from the electric machine 2. The auxiliary speed reducer is then arranged in the electric drivetrain 1, kinematically between the electric machine 2 and the speed reduction device 5.

A fourth embodiment will now be described with respect to FIG. 4. This fourth embodiment is a variant of the third embodiment of the invention, and reference should therefore be made to FIG. 3 for characteristics identical to the third embodiment.

In this embodiment, the second gear train 8 is no longer arranged between the electric machine and the torque converter, but is arranged in parallel with a transmission subassembly 76 formed by the first gear train 7 and the torque converter 6. More precisely, the second gear train 8 connects the output shaft of the electric machine to the transmission shaft at the output of the torque converter. In the example illustrated in FIG. 4, the second gear train 8 comprises an additional shaft 110 and two additional pinions, namely a first additional pinion 111 and a second additional pinion 112, but it is understood that the second gear train 8 may include more or fewer additional shafts and additional pinions.

The additional shaft 110 of the second gear train 8 is fixed firstly to the inverter pinion 81 and secondly to the first additional pinion 111. The second additional pinion 112 is arranged in the electric drivetrain 1, kinematically between the first additional pinion 111 and the transmission shaft 61. It is understood that the first additional pinion 111 drives the second additional pinion 112 in rotation, and that the latter drives in rotation the transmission shaft 61 arranged at the output of the torque converter 6.

The transmission shaft 61 fixed to the connecting pinion 31 then drives the latter in rotation in the alpha rotational direction Rα or in the omega rotational direction RΩ, depending on whether the synchronizer 12 is in engagement with the forward gear pinion 71 or the reverse gear pinion 82. Then the connecting pinion 31 drives the output pinion 3 in rotation in the first rotational direction R1 or the second rotational direction R2.

It is understood that in this embodiment, the inverter pinion 81 and the intermediate pinion 9 are no longer in engagement with one another, and that the output pinion 3 is set in rotation in the second rotational direction R2 by a force transmission line arranged in parallel with the first gear train 7 and the torque converter 6.

This particular configuration of the second gear train 8 allows it to bypass the torque converter 6 and its direct connection element 10. In fact for certain vehicles, the advantages of transmission via the torque converter are not useful in reverse gear, and it may be preferable to bypass the torque converter in reverse gear. Thus the second gear train 8 is directly adapted for compatibility between the rotational speed of the drive shaft 21 at the output from the electric machine 2 and the use of the output pinion 3 in the second rotational direction R2.

In the same way as the third embodiment of the invention, it is possible to integrate an auxiliary speed reducer at the output of the electric machine 2. The auxiliary speed reducer is then arranged in the electric drivetrain 1, kinematically between the electric machine 2 and the first and second gear trains of the speed reduction device 5.

A fifth embodiment of the electric drivetrain 1 will now be described with respect to FIG. 5. This embodiment is a variant of the second embodiment, and it is understood that only the characteristics which differ from the second embodiment will be discussed in the description below.

In this embodiment, the first gear train 7 comprises the forward gear pinion 71, and the second gear train 8 comprises the reverse gear pinion 82 and the inverter pinion 81. Also according to this embodiment, the electric drivetrain 1 comprises two output pinions 3, a first output pinion 3a and a second output pinion 3b which are fixed to either side of the axle differential 4.

The forward gear pinion 71 of the first gear train 7 is then linked in rotation to the first output pinion 3a, while the inverter pinion 81 of the second gear train 8 is linked in rotation to the second output pinion 3b.

In this fifth embodiment of the invention, the forward gear pinion 71, which is driven in rotation in the alpha rotational direction Rα by the torque transmission shaft 61 of the torque converter 6 and by the synchronizer 12, then drives the first output pinion 3a in rotation in the omega rotational direction RΩ. It is understood that in this fifth embodiment of the invention, the omega rotational direction RC) corresponds to the first rotational direction R1 of the first output pinion 3a.

Also in this fifth embodiment of the invention, the reverse gear pinion 82, which is driven in rotation in the alpha rotational direction Rα by the torque transmission shaft 61 of the torque converter 6 and by the synchronizer 12, then drives the inverter pinion 81 in rotation in the omega rotational direction RΩ. The inverter pinion 81 then drives the second output pinion 3b in rotation in the rotational direction opposite its own, i.e. in the alpha rotational direction Rα, corresponding in this fifth embodiment to the second rotational direction R2 of the second output pinion 3b.

In the same way as the second embodiment of the invention, the electric drivetrain 1 comprises the auxiliary speed reducer 52 which is kinematically arranged between the electric machine 2 and the torque converter 6. This auxiliary speed reducer 52 allows an increase of torque while reducing the rotational speed of the shaft 521 of the planetary train, which is also connected to the torque converter 6.

Still according to this fifth embodiment of the invention and according to an alternative (not shown), the coupling device 120 comprising the synchronizer 12, and the direct connection element 10 of the torque converter 6, are switchable under the action of a pressurized fluid. In this alternative, the electric drivetrain 1 may then comprise a fluid source 660, for example an oil source, common to the actuation of the direct connection element 10 and the actuation of the synchronizer 12. It is considered that all the embodiments described above may comprise the fluid source 660, allowing simultaneous actuation of the direct connection element 10 and the synchronizer 12 of the coupling device 120.

Of course, the invention is not limited to the examples that have just been described, and numerous modifications may be made to these examples without departing from the scope of the invention.

The invention as just described achieves the object set, and allows provision of a more ergonomic electric drivetrain having an improved torque transmission. Variants which are not described here may be implemented without departing from the context of the invention, provided that, in accordance with the invention, they comprise at least an electric drivetrain according to the aspect of the invention.

The invention claimed is:

1. An electric drivetrain for a vehicle comprising:
   an electric machine;
   at least one output pinion configured to be connected to an axle differential of the vehicle; and
   at least one speed reduction device,
   wherein the electric drivetrain comprises a torque converter arranged between the electric machine and said at least one output pinion,
   wherein the speed reduction device comprises at least a first gear train and a second gear train, the first gear train generating a movement of the at least one output pinion in a first rotational direction, and the second gear train generating a movement of the at least one output pinion in a second rotational direction opposite the first rotational direction, and wherein the torque converter is arranged in the electric drivetrain, kinematically between the first gear train of the speed reduction device and said at least one output pinion.

2. The electric drivetrain as claimed in claim 1, wherein the torque converter is arranged in the electric drivetrain, kinematically connected between on one side the first gear train and the second gear train of the speed reduction device, and on another side a same output pinion, wherein the same output pinion can be driven by the first gear train in the first rotational direction and by the second gear train in the second rotational direction.

3. The electric drivetrain as claimed in claim 1, wherein the second gear train is arranged in parallel with a transmission subassembly comprising the first gear train and the torque converter.

4. An electric drivetrain for a vehicle comprising:
an electric machine;
at least one output pinion configured to be connected to an axle differential of the vehicle; and
at least one speed reduction device,
wherein the electric drivetrain comprises a torque converter arranged between the electric machine and said at least one output pinion,
wherein the speed reduction device comprises at least a first gear train and a second gear train, the first gear train generating a movement of the at least one output pinion in a first rotational direction, and the second gear train generating a movement of the at least one output pinion in a second rotational direction opposite the first rotational direction,
wherein the torque converter comprises a primary element and a secondary element which is driven in rotation by the primary element under the effect of a fluid projected by the primary element, wherein the torque converter comprises an element for direct connection of the primary element to the secondary element, the direct connection element being switchable between an open state and a closed state, wherein an actuating device is configured to close the direct connection device when a coupling device is in engagement with the second gear train, and wherein the second rotational direction generated by the second gear train is a rearward direction.

5. The electric drivetrain as claimed in claim 4, wherein the torque converter is arranged in the electric drivetrain, kinematically between on one side the electric machine and on an other side the first and second gear trains of the speed reduction device.

6. A transmission system comprising an electric drivetrain as claimed in claim 5, and the axle differential kinematically connected to said at least one output pinion.

7. The electric drivetrain as claimed in claim 4, wherein the coupling device allows the torque to be directed into only one of the first gear train or the second gear train.

8. The electric drivetrain as claimed in claim 7, wherein the coupling device comprises a synchronizer which is rotationally fixed to a shaft of the electric drivetrain and arranged between the first gear train and the second gear train, wherein the synchronizer can be switched between at least a state of engagement with the first gear train, a state of engagement with the second gear train, and a free state.

9. The electric drivetrain as claimed in claim 4, wherein the coupling device and the direct connection element of the torque converter are displaceable under the action of a pressurized fluid, wherein the electric drivetrain comprises a common fluid source for actuation of the direct connection element of the torque converter and for actuation of the coupling device.

* * * * *